Sept. 24, 1968   W. MENZEL   3,402,562
METHOD AND APPARATUS FOR OPERATING SOFT ICE FREEZERS
Filed May 26, 1967   2 Sheets-Sheet 1

(A-B)

Inventor:
WALDEMAR MENZEL

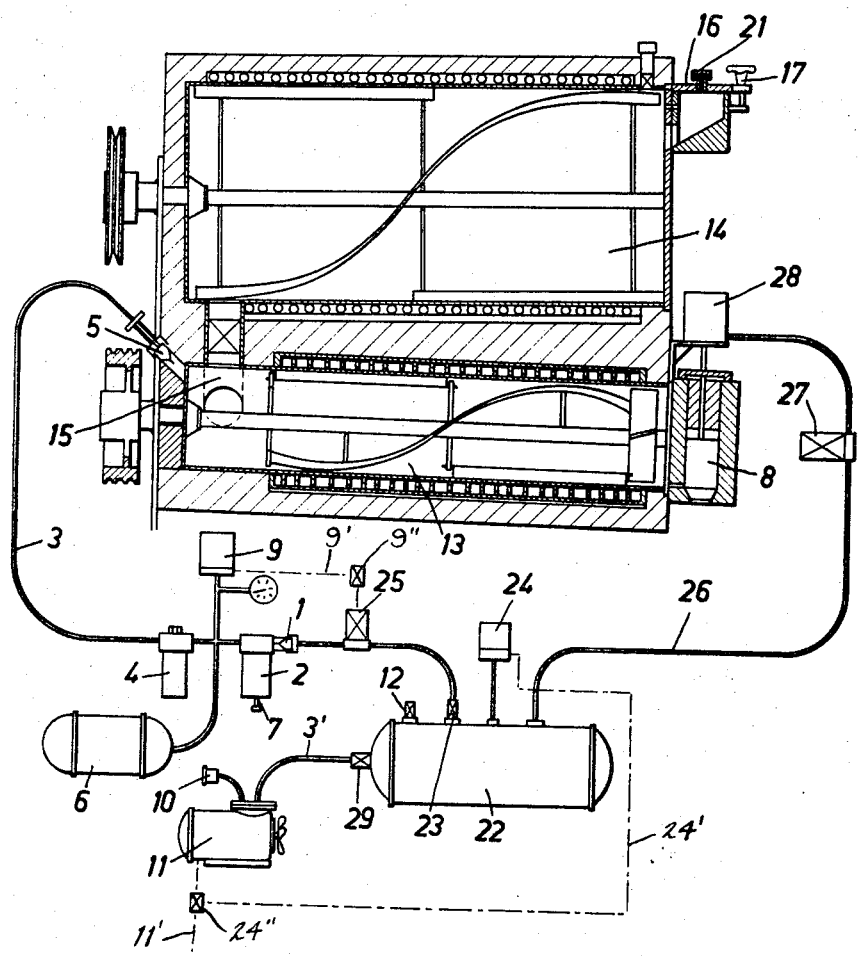

United States Patent Office 3,402,562
Patented Sept. 24, 1968

3,402,562
METHOD AND APPARATUS FOR OPERATING SOFT ICE FREEZERS
Waldemar Menzel, Burgheig, near Kulmbach, Germany, assignor to Firma Lumen GmbH Nahrmittel- und Maschinenfabrik, Kulmbach, Germany
Filed May 26, 1967, Ser. No. 641,589
Claims priority, application Germany, May 28, 1966, G 47,011
10 Claims. (Cl. 62—69)

ABSTRACT OF THE DISCLOSURE

A method and apparatus for operating freezers, particularly soft ice freezers, where the ice mix is continually supplied from a container to the freezing kettle and is maintained under excess pressure with air supplied from a compressor by means of control valves and a sensor which periodically interrupt the pressure at short intervals determined by the drop in pressure in the freezer.

Background of the invention

The present invention relates to soft ice freezers and their operation. More in particular, the invention is concerned with soft ice freezers of the type where the freezing compartment and the container for the ice mix are kept under constant pressure. In known soft ice freezers of the type concerned here the pressure decreases more or less strongly after a number of food ice portions are dispensed and particularly after longer interruptions in operation and in order to restore the normal operating pressure it becomes necessary to refill the pressurized containers with air under pressure. Under certain circumstances it may take several hours to compensate by pumping for a larger decrease in pressure that arose during the preparation of the soft ice in such a manner that the same pressure (for example 1.2 atm.) is established in the freezing kettle which is filled with soft ice and in the supply container by which it is fed. If the soft ice freezer is newly filled and operated after a longer period of standstill, for example at the beginning of the day, it is first necessary to freeze a larger quantity of soft ice, such as 4 to 6 quarts, depending on the size of the freezing kettle, which must be dispensed before the frozen product reaches the required air admixture for a vendable product. However, the air content of the soft ice removed from the freezing kettle is also subject to considerable fluctuations, depending on the extent to which the containers or compartments of the freezer are filled.

Summary of the invention

It is an object of the invention to eliminate all of these shortcomings. The method concerns the operation of the soft ice freezers herein referred to and provides for connecting and disconnecting the source of pressure at short intervals of about one minute, the control of which depends preferably on the prevailing pressure. In this manner the supply of compressed air and the pressure control can take place automatically with particularly small fluctuations and at small supervisory expense. Furthermore a smaller volume of gas or air is needed for maintaining the pressure which favors the dimensions of the installation.

The invention also relates to apparatus or means for practicing the method disclosed herein. This apparatus is either provided with a compressor having a drive means that is periodically started and stopped by a pressure sensor or feeler, or by a secondary source of pressure in the form of a pressure container or tank that is periodically connected or disconnected by a pressure sensor, which in turn is charged by a primary source of pressure such as a compressor or the like. Preferably the compressor may be in the form of a diaphragm compressor. The pressure tank is normally a compressed gas or air container.

The periodic pumping and thereby the adjustment of the desired pressure can be limited by shortening the cadence or timing of the operating periods of the compressor, in that a continually open and adjustable outlet is provided at one of the compartments under pressure or at the compressed air conduit, which is so proportioned or set that with known soft ice freezers of conventional dimensions there escapes, for example, about one quart of air per minute. As a result the pressure sensor which controls the compressor will periodically respond at the aforementioned intervals of about one minute.

Brief description of the drawings

Further features and advantages of the invention will become apparent from the following description of two embodiments of the apparatus and of the method in which reference is made to the accompanying drawings, in which.

Figure 1:
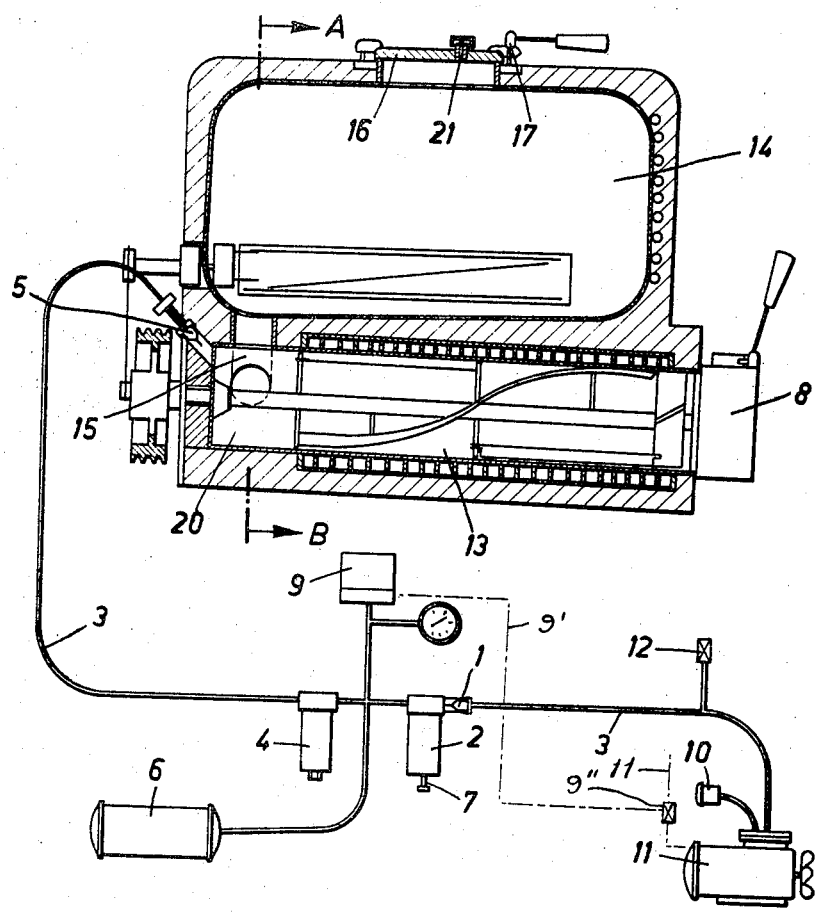
FIG. 1 illustrates the freezing kettle and the supply container of a soft ice freezer in longitudinal section and the associated compressed air apparatus to a reduced scale.

The necessary refrigerating machine has been omitted in the embodiments.

Description of the preferred embodiments of the invention

The known soft ice freezer comprises mainly the generally cylindrical freezing kettle or compartment 13, and a supply container 14 for the ice mix to be processed therein connected with the freezing container by an intake duct 15. Both containers 13 and 14 are kept under pressure during operation. The container 14 has a filling aperture which is closely sealed by a cover 16 having a pressure lock 17. The cover 16 has a discharge valve, the function of which will be described hereinafter. For the sake of completeness, stirring devices are indicated in the containers which, however, may be of a known type and require no explanation.

In the first embodiment described in FIG. 1, a compressor 11 which is preferably in the form of a diaphragm compressor and which takes in ambient air through a suction filter 10 and forces it through a compressed air conduit 3 by way of a relief or check valve 1, a pre-filter 2, a sterlizing or air degerminating filter 4 and an entrance valve 5 into the freezing kettle.

The compressor 11 is provided, for example, with an electric drive motor which is turned on and shut off by a pressure sensor 9 having switch contacts (not shown) either directly by means of a current supply conductor 9' or by way of a relay or contactor 9" connected in the current supply lead 11' of the compressor motor. The pressure sensor may, for example, be set in a manner that it interrupts the compressor drive as excess pressure of, for example 1.3 at. develops in the conduit 3 and reconnects it as soon as the pressure has dropped to about 1 at. This periodic connecting and disconnecting of the compressor drive is continually repeated during the operation of the freezer, even when soft ice is not dispensed from the freezing kettle at that time. Besides, an excess pressure valve 12 is provided for checking the compressor operation. The continuously open release in the form of a valve 7, already mentioned, is provided on the filter 2. This outlet may also be located in a different place and may be constituted, for example, by the valve 21. The purpose of valve 7 is to continually discharge sufficient air that when the compressor 11 is at standstill, the excess pressure of 1.3 at. in the section of the conduit 3 between the check valve 1 and the entrance valve 5, and in the devices connected thereto will sink to approximately 1 at. in about 30 to 60 seconds, or preferably 40 to 60 seconds, at which pressure the compressor 11 is again cut in by the pressure sensor or feeler 9. Valve 7 may at the same time serve as an automatic moisture outlet, or may be constructed as such, so that a daily or weekly emptying of accumulated moisture from the filter 2 is eliminated. The compressed air that leaves the valve 7 at intervals of about one minute, simultaneously takes along the moisture accumulating in the housing of the filter 2. The compressed air, therefore, arrives in dried condition at the degerminating filter 4 where it is freed of bacteria and the like before it reaches the freezing kettle 13 and in the air space of the ice mix container 14.

The entrance valve 5 of the freezing kettle 13 is also a check valve. It is made of a type of rubber, which is harmless according to food law requirements and has in its labial head a valve slot which is so proportioned that it causes a drop in pressure of 0.1 to 0.2 atm. when a quantity of 8 liters per minute is forced through it. Thus the excess pressure in the freezing kettle 13 is smaller by that amount than in the sections of the conduit 3 ahead of valve 5. The pressure sensor 9 is connected to the section disposed between the two check valves 1 and 5. The quantity of air received by this conduit section and the filter housings connected with it, is too small to attain an interval duration of 40 to 60 seconds for the connecting and disconnecting operations for a pressure drop of 0.3 atm. with the outlet and control valve 7 whose outlet opening must have a certain minimum cross section because of the clogging danger. Consequently, in order to increase the air space a compressed air container 6 which may have a content of 1.5 liters is connected to the section of conduit 3 between the check valves 1 and 5.

In order to initiate operations with the food ice freezer after starting the refrigerating machine and the stirring tools in the container, an amount of ice mix is filled into the container 14, in a manner that an air space of about 4 liters is left free in its upper part. As this is taking place, also the freezing kettle 13 is being filled with ice mix through the supply duct 15 so far that it covers the outlet of the supply duct in the intake chamber 20 of the freezing kettle and closes its air space. The cover 16 of the supply container is then tightly closed by means of the eccentric or cam lock 17. During the filling operation the compressor is already pumping sterilized air into the freezing kettle. The ice mix is partly pressed back through the supply duct 15 into the upper container 14 until the liquid level in the kettle 13, which is caused to drop, reaches but is slightly below the upper border of the outlet or orifice of the duct 15. Compressed air can now also escape into container 14 through the duct 15 and fill the air space of the latter until balance of pressure is established. Compressor 11 operates until an excess pressure of 1.3 atm. is attained in the pressure duct 3 and is then shut off by the pressure sensor 9. Due to the drop in pressure caused at the check valve 5 the excess pressure developed in the cylinder 13 of the freezer and in the supply container 14 will only be 1.1 to 1.2 atm. The first freezing of the contents of the freezing kettle into soft ice requires about 12 to 15 minutes. During that time the repumping takes place periodically about 10 to 15 times.

As mentioned before, the release and control valve is set in a manner that it permits about one liter of air per minute to escape to the outside; as a result, the pressure received from the pressure sensor 9 drops in about 30 to 60 seconds to one atmosphere at which pressure the compressor is turned on again. Thus the air is continually resupplied at short intervals of one minute and always readjusts the liquid level in the freezing kettle 13 by replenishing its air cushion against the pressure of the ice mix that is being supplied out of the container 14. The excess pressure escapes through the intake duct 15 from the freezing kettle 13 into the air space of the supply container 14.

In this manner a fluffy soft ice that is sufficiently supplied with air is produced already from the beginning, which may then be dispensed from the freezing kettle 13 by means of the dispensing device 8 that is connected to it. During the preparation of the soft ice the freezing kettle 13 would gradually be completely filled with ice product that is enriched with air and is being additionally expanded by the freezing process while absorbing and displacing the air in the air space. This is prevented by the described embodiment of the invention in the following manner: The pressure duct 3 as well as also the intake tube 15 lead into the special intake chamber 20 of the freezing kettle 13 which is separated from the actual freezing space by a separating wall 18. Only a small annular passage gap is open between the periphery of this wall which is in the form of a disk and the wall of the cylinder. In addition, however, the separating wall has apertures 19, for example, in the form of radial slots through which the expanding mass that is not yet properly frozen or an excess of ice mix can flow back into receiving or intake chamber 20 and escape, and thence it is forced back into the supply container 14 by the compressed air which is periodically pumped in. Thus the air which is periodically repumped insures not only even air admixture to the soft ice, but in the embodiment described it also prevents overfilling of the freezing cylinder with ice mix and ice mass.

In lieu of the relief and control valve 7 provided on the pressure filter 2, it is also possible as shown in FIG. 1 of the drawing to install the valve 21, already mentioned, on the cover of the supply container 14. Depending on the condition of the ice mix to be processed one or the other way of installing the outlet is more advantageous. In some cases both valves 7 and 21 may be provided together.

In order to supply compressed air to both parts of the soft ice freezing unit a membrane compressor having an output of 8 liters/min. is sufficient for the excess or overpressure mentioned. If the soft ice freezer is equipped with additional accessories that are pneumatically operable, for example, for the automatic control of valves for cleaning or for dispensing the ice product an additional compressed air tank is needed which may serve as a secondary source of pressure for the periodic supply of compressed air to the soft ice freezer.

Figure 2:
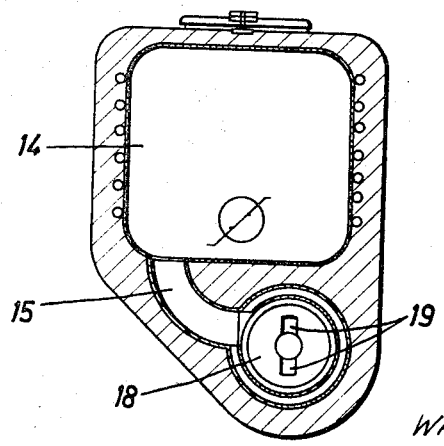
FIG. 2 is a cross section through the containers taken along line A–B in FIG. 1, FIG. 3 similarly to FIG. 1 shows the freezing kettle and the supply container in a somewhat different embodiment and with a modified form of compressor accessories.

A compressed air tank of that nature is indicated at 22 in FIG. 3. The compressor 11 supplies this tank and in that case it is of greater capacity, for example, 25 liters/min. for an excess pressure of 1 atmosphere. The compressed air conduit 3 is not directly connected to the compressor 11, but to the compressed air tank 22. It is charged by the compressor through a conduit 3' which leads to the tank 22 by way of a check valve 29. In this case the tank 22 constitutes the periodically operable source of compressed air and supplies the conduit 3 by way of a contact pressure control 23 which opens the passage to the conduit 3 only when the pressure is reached for which it is set. The conduit 3 is furthermore provided with a magnetic valve 25 which in opened condition allows an air quantity of about eight or ten liters/min. to pass at 1.5 atmospheres. This magnetic valve is periodically controlled by the pressure sensor 9 in a similar manner as the compressor drive in the first embodiment by means of a current control conduit 9' either direct or with a relay or contactor 9''. Thus the periodic switching is not effected at the primary pressure source 11, but at the secondary source of pressure constituted by the compressed air tank 22, although otherwise the principle remains the same. In the pressure conduit 3 generally the same conditions prevail as in the embodiment in accordance with FIGS. 1 and 2. The components 2 and 7 can fully correspond with the components in FIG. 1 that bear the same numerals and they perform the same functions. The compressor 11 is no longer controlled by the pressure sensor 9 as in the first embodiment but by a further pressure sensor 24 connected to the compressed air tank 22, and accordingly it operates no longer periodically at short intervals as the compressor of the first embodiment. Also here the starting and stopping of the drive motor for the compressor 11 may be effected through switch contacts (not shown), an electric control conduit 24' and a relay or contactor 24" having operating contacts disposed in the current supply conduit 11' of the compressor motor. The periodic pressure supply to the conduit 3 is effected as aforesaid by the periodic opening and closing of the valve 25 under control of sensor 9.

Owing to the storage function of the compressed air tank 22 it is possible to connect additional compressed air consuming devices thereto, without interfering with the control of the pressure in the freezing kettle 13 and in the mix supply container 14. FIG. 3 shows a conduit 26 leading from the supply tank 22 by way of a control device 27 to the operating cylinder 28 of the soft ice dispensing device 8 which in this embodiment is pneumatically operated. In a similar manner it is possible to supply compressed air from the tank 22 to other pneumatically operable control or auxiliary devices.

Having now described the invention with reference to the embodiments illustrated in the drawings, I do not wish to be limited thereto but what I desire to protect by Letters Patent of the United States is set forth in the appended claims.

I claim:
1. Method for operating soft ice freezers of the type where the freezing kettle and the ice mix supply container connected thereto by a channel are continually kept under excess pressure by air from a common source under constant excess pressure, said method comprising the steps of periodically connecting and disconnecting the common source of compressed air at short time intervals of approximately one minute and maintaining the kettle at a freezing temperature to incorporate the air into the ice mix.

2. Apparatus for freezing soft ice comprising a food ice freezer, an ice mix container in supply communication with said freezer for supplying ice mix thereto, a source of compressed air including a compressor, a supply line including a conduit connecting said source to said freezer a pressure sensor connected to said conduit operative periodically to connect and disconnect said source of compressed air and a continuously open compressed air outlet in said supply line to permit the escape of a part of the air supplied by said source.

3. Apparatus as set forth in claim 2, including a pressure tank as a secondary source of pressure, said tank being connected to said compressor to be supplied with compressed air and to said freezer to supply compressed air thereto and said sensor being connected to said pressure tank to control the supply of air therefrom.

4. Apparatus in accordance with claim 2, where said supply line is provided with two check valves, one connected to said conduit and to said freezer on one side of said sensor and the other to said conduit on the other side of said sensor.

5. Apparatus in accordance with claim 4, including an additional compressed air container in the section of said conduit between said two check valves.

6. Apparatus in accordance with claim 2, including a gas filter connected to said conduit and said open outlet is connected to said gas filter to serve at the same time as an outlet for moisture and for dehydrating said filter.

7. Apparatus in accordance with claim 2, where said mix container is provided with a cover and said open outlet is connected to said cover.

8. Apparatus in accordance with claim 3, where a valve adapted to be periodically actuated by said sensor is connected in said supply line from said tank.

9. Apparatus in accordance with claim 8, where additional devices operated by compressed air are connected to said pressure tank.

10. Apparatus in accordance with claim 3, including a further pressure sensor connected to said pressure tank, operative to actuate said compressor.

References Cited
UNITED STATES PATENTS

| | | | |
|---|---|---|---|
| 2,827,773 | 3/1958 | Detjen | 62—135 |
| 3,183,681 | 5/1965 | Lutz et al. | 62—342 X |
| 3,196,633 | 7/1965 | Rapazzini et al. | 62—342 |
| 3,304,737 | 2/1967 | Strutynski | 62—179 |

ROBERT A. O'LEARY, *Primary Examiner.*

W. E. WAYNE, *Assistant Examiner.*